United States Patent
Amundsen

[11] Patent Number: 5,485,857
[45] Date of Patent: Jan. 23, 1996

[54] AUTOMATIC TRANSMISSION COOLER FLUSHING DEVICE

[76] Inventor: Thomas L. Amundsen, 1100 E. Streamwood Blvd., Streamwood, Ill. 60107

[21] Appl. No.: 255,461

[22] Filed: Jun. 8, 1994

[51] Int. Cl.$^6$ ........................................ B08B 9/02
[52] U.S. Cl. ................... 134/102.2; 134/166 C; 134/169 A; 239/373
[58] Field of Search ............................ 134/102.1, 169 A, 134/166 C, 168 C; 239/270, 526, 311, 339, 373, 378, 375

[56] References Cited

U.S. PATENT DOCUMENTS

| | | | |
|---|---|---|---|
| 1,536,352 | 5/1925 | Murry | 239/375 |
| 1,777,925 | 10/1930 | Kollman | 239/375 |
| 1,809,073 | 6/1931 | Schylander | 239/375 X |
| 1,822,743 | 9/1931 | Mitchell | 239/375 X |
| 2,005,776 | 6/1935 | Downs | 239/375 X |
| 2,525,978 | 10/1950 | Vallerie . | |
| 2,602,004 | 7/1952 | Faktor | 239/375 X |
| 2,717,804 | 9/1955 | White, Jr. | 239/373 |
| 2,842,465 | 7/1958 | Harrison | 239/373 X |
| 3,282,510 | 11/1966 | Schwartz | 239/373 |
| 3,362,640 | 1/1968 | Fainman | 239/373 |
| 3,797,507 | 3/1974 | Jackson . | |
| 4,121,948 | 10/1978 | Guhlin | 134/169 A |
| 4,412,551 | 11/1983 | Peters et al. . | |
| 4,671,230 | 6/1987 | Turnipseed . | |
| 4,991,608 | 2/1991 | Schweiger . | |
| 5,097,806 | 3/1992 | Vataru et al. | 134/169 A |
| 5,119,992 | 6/1992 | Grime | 239/373 |
| 5,328,095 | 7/1994 | Wickenhaver | 239/113 |
| 5,392,796 | 2/1995 | Coleman | 134/169 A |
| 5,425,333 | 6/1995 | Baylor | 134/169 A |

*Primary Examiner*—Frankie L. Stinson
*Attorney, Agent, or Firm*—Charles F. Meroni, Jr.; Robert Toczycki

[57] ABSTRACT

This invention concerns a hand held portable transmission cooler flushing apparatus comprising a high pressure liquid spray gun, and a hose connected to the liquid spray gun. The liquid spray gun comprises an air inlet plug fitting attachment, a handle, an air valve, a trigger, the trigger being loosely connected about a top end of the handle, the trigger being positioned in such a way that when the trigger is pulled while holding the handle the trigger then pushes an air valve button into the air valve opening an air passageway within the air valve, a lid structure, a canister for holding a cleaning solvent, the canister having an open end, the canister being covered by the lid structure at the open end in an air tight assembly, the lid structure having an angular high pressure air passageway and an angular high pressure liquid passageway, the angular high pressure air passageway having an entrance that is connected to an air outlet at a top end of the handle and an exit that is exposed to an inside of the canister, the angular high pressure liquid passageway having an entrance exposed to an inside of the canister and an exit that is exposed outside of the canister, a pressure tube, the pressure tube being hollow, the pressure tube being attached to the entrance of angular high pressure liquid passageway and extending downwardly to a bottom of the canister for transportation of the cleaning solvent in the canister, and a nozzle, the nozzle being attached to the exit of the angular high pressure liquid passageway. One end of the hose is attached to the nozzle and the other end of the hose is attached to one opening of a transmission cooler and when the liquid spray gun is attached to an air pressure system, the cleaning solvent can be passed through the hose hydraulically in a stream from the liquid spray gun by air pressure from the air pressure system into and through the transmission cooler and out a second opening of the transmission cooler by pulling the trigger to clean and check the flow of the automobile transmission cooler, after the cleaning solvent has been forced out of the canister in a stream a further cleaning action can then be performed by forcing pressurized air through the canister and into the transmission cooler, the pressurized air that is passed through the canister mixes with a residue of the cleaning solvent remaining in the canister thereby providing an atomized cleaning action in addition to flushing the transmission cooler with the hydraulic stream cleaning solvent.

20 Claims, 2 Drawing Sheets

5,485,857

AUTOMATIC TRANSMISSION COOLER FLUSHING DEVICE

BACKGROUND OF THE INVENTION

1. Field of the Invention

The present invention relates generally to a cleaning apparatus for use in flushing cooling systems of automatic transmissions in automobiles. The cooling systems of automatic transmissions in automobiles can accumulate debris and varnished fluid deposits. This accumulated debris and varnished fluid deposits degrade the cooling performance of the transmission cooling system by reducing the desired heat transfer of the cooling system. Clogged or restricted transmission coolers can be a cause of recurring transmission failures. Restriction of cooler flow can cause overheating of the transmission fluid and reduce important lubrication to internal rotating pans. This in turn will limit the life of the automobile transmission since the transmission will have to operate at a higher temperature.

It is therefore the principle object of this invention to provide an automatic transmission cooler flushing device that is easy to use, inexpensive, portable and hand held thereby giving the operator control and flexibility in flushing an automobile transmission cooler. It is further contemplated to provide a flushing apparatus that can quickly and thoroughly clean the transmission cooler while determining whether there is blockage or debris within the transmission cooler. By providing a hand held, triggered pulsing flushing apparatus, the operator can manually pulse the trigger thereby flushing the transmission cooler with a pulsed fluid flow and being able to dislodge debris and varnish deposits. When the cleaning solvent within the flushing apparatus is forced out of the hand held flushing apparatus, the remainder of the fluid within the flushing apparatus becomes atomized with the high air pressure and provides a further atomized cleaning action thereby dislodging any additional stubborn debris. The atomization of the cleaning solvent occurs automatically after the cleaning solvent is forced out of the canister and through the transmission cooler.

2. Description of the Prior Art

There are several different systems for cleaning automobile transmission coolers. These systems are fairly complicated and can be expensive. In addition, these systems are typically large and need to be moved around on a cart. These prior art devices also do not offer the flexibility to perform flow testing of the transmission cooler to determine if there is any blockage within the transmission cooler. Other devices also use more than one vessel or tank for flushing the system thereby making these devices less portable and more complicated to use.

Further, the prior art devices do not offer the flexibility of being able to manually pulse cleaning solvent through the transmission cooler. Debris and varnished fluid deposits can block fluid flow within the transmission cooler. Prior art devices will typically flush systems with a constant flow through the transmission cooler. Other prior art devices provide forcing only atomized solvent through the transmission cooler. Such constant fluid flow or atomized solvent will not always dislodge debris out of the transmission cooler. If it is found that the fluid flow through the transmission coils is blocked or retarded, the entire transmission cooler will need to be replaced.

These and other types of flushing devices disclosed in the prior art do not offer the flexibility and inventive features of my hand held portable transmission cooler flushing apparatus. As will be described in greater detail hereinafter, the hand held portable transmission cooler flushing apparatus of the present invention differs from those that previously existed.

SUMMARY OF THE INVENTION

According to my present invention I have provided a hand held portable transmission cooler flushing apparatus comprising a high pressure liquid spray gun, a hose connected to the liquid spray gun, the liquid spray gun comprising an air inlet plug fitting attachment, a handle, the handle having an open passageway through the length of the handle, the handle having an air inlet and an air outlet at opposite ends of the open passageway, the air inlet plug fitting attachment being connected to the air inlet of the handle, an air valve, the air valve being connected near the air outlet to the handle, the air valve having an air passageway that can be opened and closed, the air valve containing a compression spring that acts to keep the air passageway closed, an air valve button, the air valve button being connected at one end of the air valve so that when the air valve button is pressed the air passageway within the air valve is then opened and when the air valve button is released then the compression spring acts to close the air valve passageway within the air valve, a trigger, the trigger being loosely connected about a top end of the handle, the trigger being positioned in such a way that when the trigger is pulled while holding the handle the trigger then pushes the air valve button into the air valve opening the air passageway within the air valve, a lid structure including a lower lid portion and an upper air and liquid transfer housing portion, a canister for holding a cleaning solvent, the canister having an open end, the canister being covered by the lid structure at the open end in an air tight assembly, the lid structure having an angular high pressure air passageway and an angular high pressure liquid passageway, the angular high pressure air passageway having an entrance in the upper air and liquid transfer housing portion and an exit in the lower lid portion, the entrance of the angular high pressure air passageway being connected to the air outlet of the handle, the exit of the lid air inlet tube being exposed to an inside of the canister, the angular high pressure liquid passageway having an entrance in the lower lid portion and an exit in the upper air and liquid transfer housing portion, the entrance of the angular high pressure liquid passageway being exposed to an inside of the canister, the exit of the angular high pressure liquid passageway being exposed outside of the canister, a pressure tube, the pressure tube being hollow, the pressure tube being attached to the entrance of angular high pressure liquid passageway and extending downwardly to a bottom of the canister for transportation of the cleaning solvent in the canister, and a nozzle, the nozzle being attached to the exit of the angular high pressure liquid passageway, the hose being attached to the nozzle whereby when the liquid spray gun is attached to an air pressure system at the air inlet plug fitting attachment and the hose is attached to a transmission cooler, cleaning solvent, atomized cleaning solvent and air can be passed through the hose from the liquid spray gun by air pressure from the air pressure system into the transmission cooler by pulling the trigger to clean and check the flow of the transmission cooler.

Another feature of my invention relates to the hand held portable transmission cooler flushing apparatus described above wherein the angular high pressure air passageway has an air pressure relief valve attached thereto thereby regulating that amount of air pressure that passes through the angular high pressure air passageway into the canister.

Still another feature of my invention concerns the hand held portable transmission cooler flushing apparatus described above wherein the air inlet of the handle has an air pressure gauge and an air pressure regulator attached thereto thereby allowing the user to monitor and adjust the air pressure entering the hand held portable transmission cooler flushing apparatus.

According to important features of my invention I have also provided a lower lid portion and an upper air and liquid transfer housing portion that comprises a one piece structure.

Yet another feature of my invention I have provided a cleaning solvent for use with my hand held portable transmission cooler flushing apparatus wherein the cleaning solvent is a fluid selected from the group consisting of automatic transmission fluid and mineral spirits.

Other objects, features and advantages of my invention will become more readily apparent upon reference to the following description when taken in conjunction with the accompanying drawings, which drawings illustrate several embodiments of my invention.

DETAILED DESCRIPTION OF THE PREFERRED EMBODIMENT

My hand held portable transmission cooler flushing apparatus is used to clean the cooling systems of automatic automobile transmissions. It is contemplated that a cleaning solvent such transmission fluid or mineral spirits be used when flushing automatic transmission cooling systems. My hand held portable transmission cooler flushing apparatus can also be used as a flow tester in determining if there is any blockage or debris within the transmission cooler. My hand held portable transmission cooler flushing apparatus operates as a gun type assembly with compressed air accelerating cleaning solvent through the transmission cooler and after most of the cleaning solvent is forced out of the apparatus, the left over amount of solvent within apparatus is mixed with the high air pressure and is atomized thereby further cleaning the transmission cooler with atomized cleaning solvent. If it is determined that the cleaning solvent is not flushed through the transmission cooler within a specified amount of time, then a second or third flushing may be necessary. Further, the operator is given the flexibility to manually pulse the cleaning solvent through the transmission cooler. By pulsing the cleaning solvent through the transmission cooler, any blockage or debris is more easily dislodged and flushed out of the transmission cooler.

Figure 1:
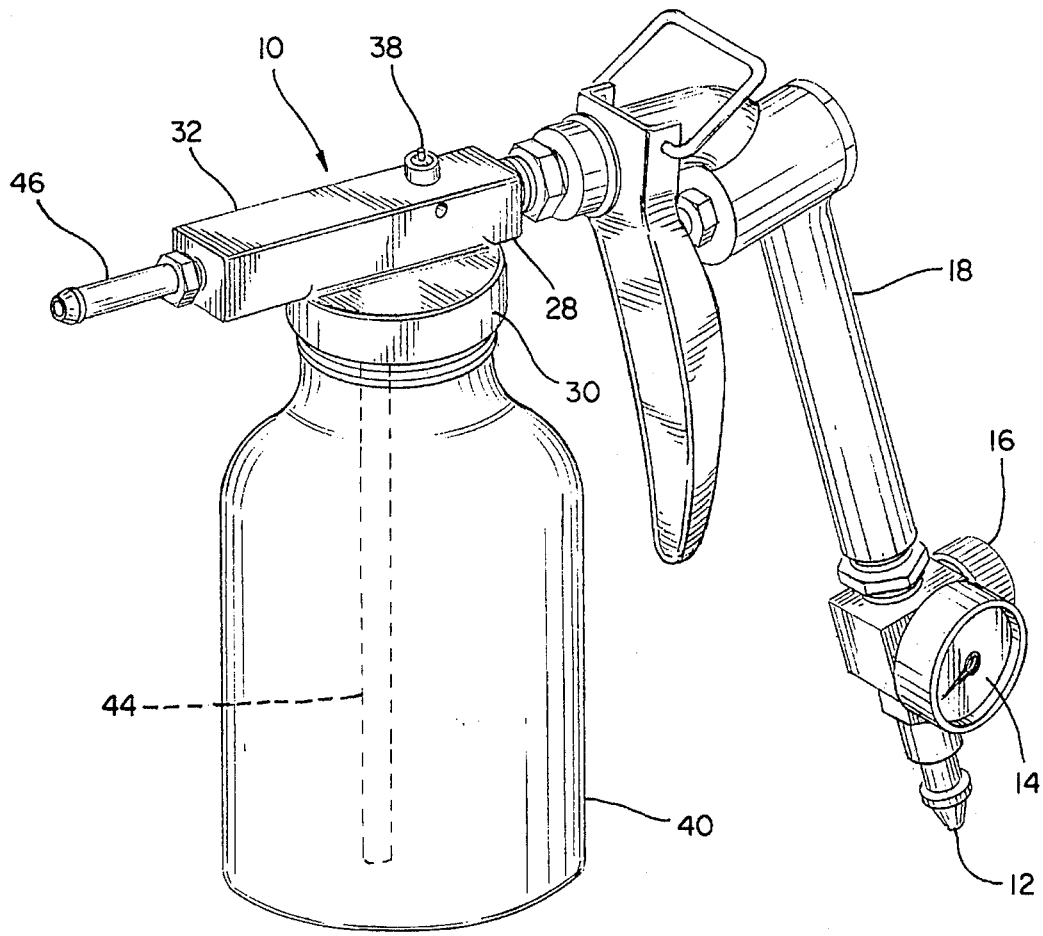
FIG. 1 is an enlarged perspective view of my automatic transmission cooler flushing device.

Referring now to the drawings, FIG. 1 shows my high pressure liquid spray gun 10. The high pressure liquid spray gun comprises an air inlet plug fitting attachment 12. The air inlet plug fitting attachment 12 is of the type that can be attached to standard compressed air systems. The typical fitting size for the air inlet plug fitting attachment 12 is ¼inch NPS (American Standard Straight Pipe Thread) or ⅜inch NPS and can be attached to a ¼inch or ⅜inch NPS coupler respectively that is attached to a compressed air hose.

The high pressure liquid spray gun 10 further comprises an air pressure gauge 14 and an air pressure regulator 16 that is attached between the air inlet plug fitting attachment 12 and a handle 18. The air pressure gauge 14 allows the user to monitor the amount of air pressure that is entering the high pressure liquid spray gun 10. The air pressure regulator 16 further allows the user to adjust the air pressure as is necessary. When flushing a cooling system of a transmission, excellent results can be obtained when the air pressure is set at 35 psi (pounds per square inch). Excellent results can still be obtained when the air pressure is maintained between 25 psi and 75 psi.

At a top portion of the handle 18 is an air valve 20. The air valve 20 has a compression spring 22 (FIG. 5) inside keeping the air valve 20 in a closed position. An air valve button 24 extending outside of the air valve 20 is located adjacent the compression spring 22 whereby when the air valve button 24 is pressed into the air valve 20, air pressure is then allowed to pass through the air valve 20 and through an air passageway within the handle 18. A trigger 26 is loosely connected about a top end of the handle 18. The trigger 26 is positioned in such a way that when the trigger 26 is pulled by a user, the trigger pushes against the air valve button 24 opening the air valve 20.

Figure 2:
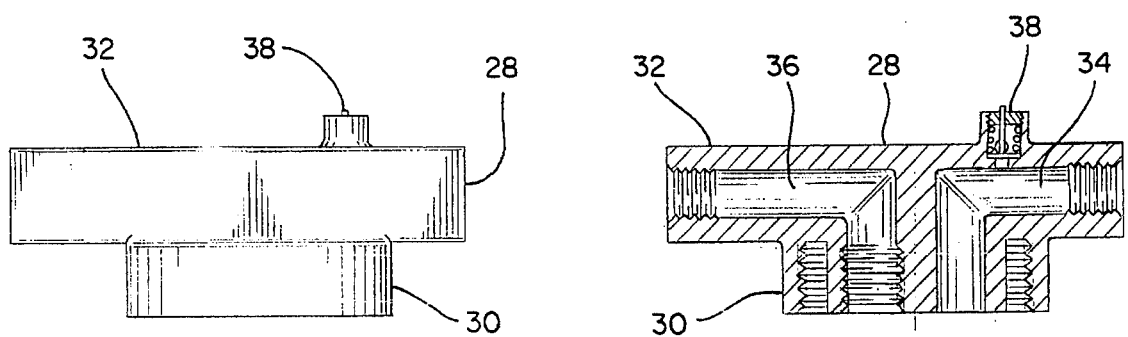
FIG. 2 is an enlarged side view of the lid of my automatic transmission cooler flushing device.
Figure 3:
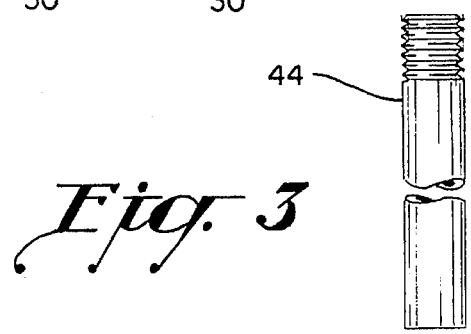
FIG. 3 is an enlarged longitudinal cross-sectional side view of the lid of my automatic transmission cooler flushing device showing how the lid is attached to the bottle and how the pressure tube is attached to the lid.
Figure 4:
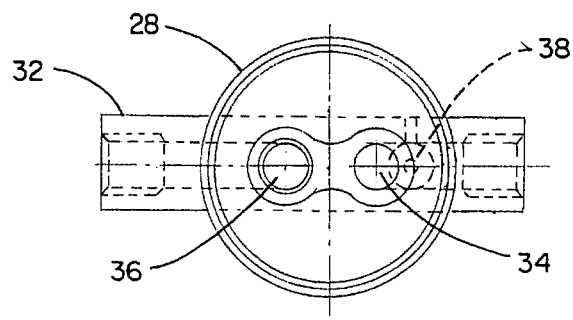
FIG. 4 is an enlarged top view of the lid of my automatic transmission cooler flushing device.

A lid structure 28 (FIGS. 2, 3 and 4) comprising a lower lid portion 30 and an upper air and liquid transfer housing portion 32 is attached to a top portion of the handle 18. The lid structure 28 contains an angular high pressure air passageway 34 and an angular high pressure liquid passageway 36. It is contemplated that the lid structure 28 is a one piece molded structure made of metal. An entrance of the angular high pressure air passageway 34 is attached to an exit of the air passageway from the handle 18. The angular high pressure air passageway 34 also contains an air pressure relief valve 38. The air pressure relief valve 38 discharges any excess air pressure that may be in the air passageway of the lid structure 28. Excellent results can be achieved when the pressure relief valve 38 is set to maintain an air pressure below 75 psi.

Figure 5:
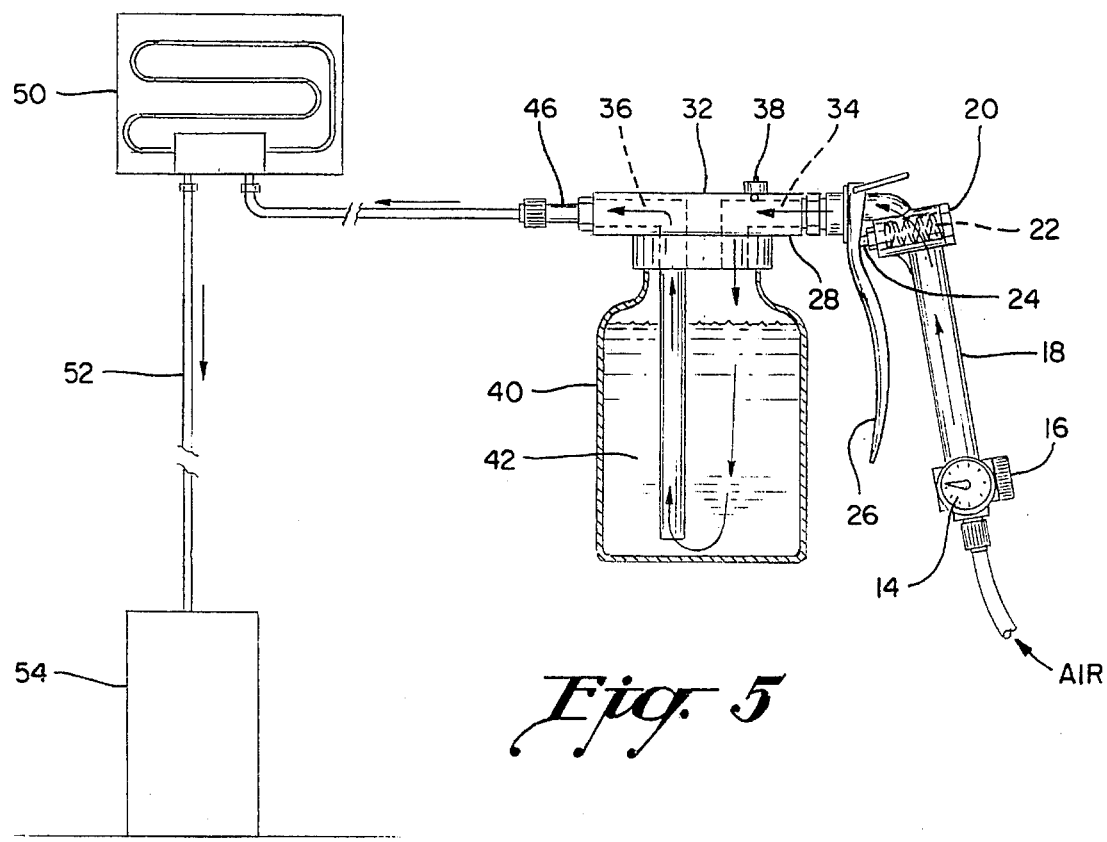
FIG. 5 is a diagram of my automatic transmission cooler flushing device illustrating the way in which my device is used to flush an automatic transmission cooler.

The lid structure 28 is attached or screwed onto a canister 40 (FIGS. 1 and 5). The canister 40 can typically hold up to one quart of cleaning solvent 42. Cleaning solvents that can be used to clean and flush an automobile transmission cooler include using automatic transmission fluid and/or mineral spirits. A pressure tube 44 (FIG. 3) is attached to the angular high pressure liquid passageway 36 on the lid structure 28 and extends down into the canister 40 in order to transfer the cleaning solvent 42 out of the canister 40.

A nozzle 46 (FIGS. 1 and 5) is attached to an exit of the angular high pressure liquid passageway 36. One end of a hose 48 is attached to the nozzle 46 and the other end of the hose is attached to an entrance opening in the automobile transmission cooler 50 (FIG. 5). The hose 48 is used to transport the cleaning solvent 42 into the automobile transmission cooler 50 for flushing and cleaning. A second hose 52 is attached to an exit opening in the automobile transmission cooler 50 or a drain pan is placed under an exit opening in the automobile transmission cooler 50 to receive and collect overflow cleaning solvent 54 that has been flushed through the transmission cooler 50.

It is contemplated that the operator of my hand held automatic transmission cooler flushing device can force one quart of cleaning solvent through the transmission cooler and determine if the cleaning solvent passed through the transmission cooler within a specified amount of time. This procedure tests the internal flow of the transmission cooler and can determine if any debris or blockage is in the transmission cooler. After the cleaning solvent has been forced out of the canister, the remaining cleaning solvent left within the canister is atomized and provides a further cleaning action within the transmission cooler. If the cleaning solvent does not pass through the transmission cooler properly, the operator can then flush the transmission cooler a second time, this time the operator can pulse the flow of the cleaning solvent through the transmission cooler thereby dislodging debris from the coils of the transmission cooler. The pulsing action of the fluid flow further helps to dislodge and clean the coils of the transmission cooler. The operator also has the option to reverse the fluid flow through the transmission cooler by switching the hose connections at the entrance and exit of the transmission cooler thereby providing a further flushing technique for cleaning and dislodging stubborn debris from a transmission cooler. The above stated flushing methods provide additional ways to flush and clean a transmission cooler thereby avoiding having to replace the entire transmission cooler as is normally done. Therefore I have provided a system and apparatus for flushing automatic transmission coolers that is hand held, portable, pressure regulated and can be pulsed by a trigger. Furthermore my automatic transmission cooler flushing apparatus cleans automatic transmission coolers using constant or pulsed fluid flow followed automatic by an atomized cleaning action and if it is still determined that there is blockage or debris within the transmission cooler, the same procedure can be applied again in reverse direction by switching the hose connections.

As various possible embodiments may be made in the above invention for use for different purposes and as various changes might be made in the embodiments and method above set forth, it is understood that all of the above matters here set forth or shown in the accompanying drawings are to be interpreted as illustrative and not in a limiting sense.

I claim:

1. A hand held portable transmission cooler flushing apparatus comprising a high pressure liquid spray gun, a hose connected to said liquid spray gun, said liquid spray gun comprising an air inlet plug fitting attachment, a handle, said handle having an open passageway through the length of the handle, said handle having an air inlet and an air outlet at opposite ends of the open passageway, said air inlet plug fitting attachment being connected to the air inlet of the handle, an air valve, said air valve being connected near the air outlet to the handle, said air valve having an air passageway that can be opened and closed, said air valve containing a compression spring that acts to keep the air passageway closed, an air valve button, said air valve button being connected at one end of the air valve so that when the air valve button is pressed the air passageway within the air valve is then opened and when the air valve button is released then said compression spring acts to close said air valve passageway within the air valve, a trigger, said trigger being loosely connected about a top end of the handle, said trigger being positioned in such a way that when the trigger is pulled while holding said handle, the trigger then pushes the air valve button into the air valve opening the air passageway within the air valve, a lid structure including a lower lid portion and an upper air and liquid transfer housing portion, a canister for holding a cleaning solvent, said canister having an open end, said canister being covered by the lid structure at said open end in an air tight assembly, said lid structure having an angular high pressure air passageway and an angular high pressure liquid passageway, said angular high pressure air passageway having an entrance in the upper air and liquid transfer housing portion and an exit in the lower lid portion, said entrance of the angular high pressure air passageway being connected to the air outlet of the handle, said exit of the lid air inlet tube being exposed to an inside of the canister, said angular high pressure liquid passageway having an entrance in the lower lid portion and an exit in the upper air and liquid transfer housing portion, said entrance of the angular high pressure liquid passageway being exposed to an inside of the canister, said exit of the angular high pressure liquid passageway being exposed outside of the canister, a pressure tube, said pressure tube being hollow, said pressure tube being attached to the entrance of angular high pressure liquid passageway and extending downwardly to a bottom of the canister for transportation of the cleaning solvent in the canister, and a nozzle, said nozzle being attached to the exit of the angular high pressure liquid passageway, said hose being attached to the nozzle whereby when the liquid spray gun is attached to an air pressure system at the air inlet plug fitting attachment and the hose is attached to one opening of a transmission cooler, said cleaning solvent can be passed through the hose hydraulically in a stream from the liquid spray gun by air pressure from the air pressure system into and through the transmission cooler and out a second opening of the transmission cooler by pulling the trigger to clean and check the flow of the automobile transmission cooler said trigger also enabling a pulsating action of said cleaning solvent through the transmission cooler to provide additional cleaning action in removing stubborn debris after said cleaning solvent has been forced out of the canister in a stream a further cleaning action can, then be performed by forcing pressurized air through the canister and into the transmission cooler, the pressurized air that is passed through the canister mixes with a residue of the cleaning solvent remaining in the canister thereby providing an atomized cleaning action in addition to flushing the transmission cooler with the hydraulic stream of the cleaning solvent.

2. The hand held portable transmission cooler flushing apparatus of claim 1 wherein said angular high pressure air passageway has an air pressure relief valve attached thereto thereby regulating that amount of air pressure that passes through the angular high pressure air passageway into the canister.

3. The hand held portable transmission cooler flushing apparatus of claim 2 wherein said air pressure relief valve is set to maintain a pressure below 75 pounds per square inch.

4. The hand held portable transmission cooler flushing apparatus of claim 1 wherein said air inlet of the handle has an air pressure gauge and an air pressure regulator attached thereto thereby allowing the user to monitor and adjust the air pressure entering the hand held portable transmission cooler flushing apparatus.

5. The hand held portable transmission cooler flushing apparatus of claim 1 wherein said air pressure entering the high pressure liquid spray gun is set at 35 pounds per square inch.

6. The hand held portable transmission cooler flushing apparatus of claim 1 wherein said lower lid portion and said upper air and liquid transfer housing portion comprise a one piece molded structure.

7. The hand held portable transmission cooler flushing apparatus of claim 1 wherein said cleaning solvent is a fluid selected from the group consisting of automatic transmission fluid and mineral spirits.

8. The hand held portable transmission cooler flushing apparatus of claim 1 wherein said canister can hold up to 1 quart of cleaning solvent.

9. In combination, a hand held portable transmission cooler flushing apparatus, cleaning solvent and pressured air means, the hand held portable transmission cooler flushing apparatus comprising a liquid spray gun, said liquid spray gun being connected to a hose, said liquid spray gun comprising an air inlet plug fitting attachment, a handle, said handle having an open passageway through the length of the handle, said handle having an air inlet and an air outlet at opposite ends of the open passageway, said air inlet plug fitting attachment being connected to the air inlet of the handle, an air valve, said air valve being connected near the air outlet to the handle, said air valve having an air passageway that can be opened and closed, said air valve containing a compression spring that acts to keep the air passageway closed, an air valve button, said air valve button being connected at one end of the air valve so that when the air valve button is pressed the air passageway within the air valve is then opened and when the air valve button is released then said compression spring acts to close said air valve passageway within the air valve, a trigger, said trigger being loosely connected about a top end of the handle, said trigger being positioned in such a way that when the trigger is pulled while holding said handle, the trigger then pushes the air valve button into the air valve opening the air passageway within the air valve, a lid structure including a lower lid portion and an upper air and liquid transfer housing portion, a canister for holding said cleaning solvent, said canister having an open end, said canister being covered by the lid structure at said open end in an air tight assembly, said lid structure having an angular high pressure air passageway and an angular high pressure liquid passageway, said angular high pressure air passageway having an entrance in the upper air and liquid transfer housing portion and an exit in the lower lid portion, said entrance of the angular high pressure air passageway being connected to the air outlet of the handle, said exit of the lid air inlet tube being exposed to an inside of the canister, said angular high pressure liquid passageway having an entrance in the lower lid portion and an exit in the upper air and liquid transfer housing portion, said entrance of the angular high pressure liquid passageway being exposed to an inside of the canister, said exit of the angular high pressure liquid passageway being exposed outside of the canister, a pressure tube, said pressure tube being hollow, said pressure tube being attached to the entrance of angular high pressure liquid passageway and extending downwardly to a bottom of the canister for transportation of the cleaning solvent in the canister, and a nozzle, said nozzle being attached to the exit of the angular high pressure liquid passageway, said hose being attached to the nozzle whereby when the liquid spray gun is attached to the pressured air means at the air inlet plug fitting attachment and the hose is attached to one opening of a transmission cooler, said cleaning solvent can be passed through the hose hydraulically in a stream from the liquid spray gun by air pressure from the pressured air means into and through the transmission cooler and out a second opening of the transmission cooler by pulling the trigger to clean and check the flow of the automobile transmission cooler said trigger also enabling a pulsating action of said cleaning solvent through the transmission cooler to provide additional cleaning action in removing stubborn debris, after said cleaning solvent has been forced out of the canister in a stream a further cleaning action can then be performed by forcing pressurized air through the canister and into the transmission cooler, the pressurized air that is passed through the canister mixes with a residue of the cleaning solvent remaining in the canister thereby providing an atomized cleaning action in addition to flushing the transmission cooler with the hydraulic stream of the cleaning solvent.

10. The combination of claim 9 wherein said angular high pressure air passageway has an air pressure relief valve attached thereto thereby regulating that amount of air pressure that passes through the angular high pressure air passageway into the canister.

11. The combination of claim 10 wherein said air pressure relief valve is set to maintain a pressure below 75 pounds per square inch.

12. The combination of claim 9 wherein said air inlet of the handle has an air pressure gauge and an air pressure regulator attached thereto thereby allowing the user to monitor and adjust the air pressure entering the hand held portable transmission cooler flushing apparatus.

13. The combination of claim 9 wherein said air pressure entering the high pressure liquid spray gun is set at 35 pounds per square inch.

14. The combination of claim 9 wherein said lower lid portion and said upper air and liquid transfer housing portion comprise a one piece molded structure.

15. The combination of claim 9 wherein said cleaning solvent is a fluid selected from the group consisting of automatic transmission fluid and mineral spirits.

16. The combination of claim 9 wherein said canister can hold up to 1 quart of cleaning solvent.

17. In a system for flushing an automobile transmission cooler, the improvement of the system including a hand held portable transmission cooler flushing apparatus for flushing an automobile transmission cooler, cleaning solvent and pressured air means, the hand held portable transmission cooler flushing apparatus comprising a liquid spray gun, said liquid spray gun being connected to a hose, said liquid spray gun comprising an air inlet plug fitting attachment, a handle, said handle having an open passageway through the length of the handle, said handle having an air inlet and an air outlet at opposite ends of the open passageway, said air inlet plug fitting attachment being connected to the air inlet of the handle, an air valve, said air valve being connected near the air outlet to the handle, said air valve having an air passageway that can be opened and closed, said air valve containing a compression spring that acts to keep the air passageway closed, an air valve button, said air valve button being connected at one end of the air valve so that when the air valve button is pressed the air passageway within the air valve is then opened and when the air valve button is released then said compression spring acts to close said air valve passageway within the air valve, a trigger, said trigger being loosely connected about a top end of the handle, said trigger being positioned in such a way that when the trigger is pulled while holding said handle, the trigger then pushes the air valve button into the air valve opening the air passageway within the air valve, a lid structure including a lower lid portion and an upper air and liquid transfer housing portion, a canister for holding said cleaning solvent, said canister having an open end, said canister being covered by the lid structure at said open end in an air tight assembly, said lid structure having an angular high pressure air passageway and an angular high pressure liquid passageway, said angular high pressure air passageway having an entrance in the upper air and liquid transfer housing portion and an exit in the lower lid portion, said entrance of the angular high pressure air passageway being connected to the air outlet of the handle, said exit of the lid air inlet tube being exposed to an inside of the canister, said angular high pressure liquid passageway having an entrance in the lower lid portion and an exit in the upper air and liquid transfer housing portion, said entrance of the angular high pressure liquid passageway being exposed to an inside of the canister, said exit of the angular high pressure liquid passageway being exposed outside of the canister, a pressure tube, said pressure tube being hollow, said pressure tube being attached to the entrance of angular high pressure liquid passageway and extending downwardly to a bottom of the canister for transportation of the cleaning solvent in the canister, and a nozzle, said nozzle being attached to the exit of the angular high pressure liquid passageway, said hose being attached to the nozzle whereby when the liquid spray gun is attached to the pressured air means at the air inlet plug fitting attachment and the hose is attached to one opening of a transmission cooler, said cleaning solvent can be passed through the hose hydraulically in a stream from the liquid spray gun by air pressure from the pressured air means into and through the transmission cooler and out a second opening of the transmission cooler by pulling the trigger to clean and check the flow of the automobile transmission cooler said trigger also enabling a pulsating action of said cleaning solvent through the transmission cooler to provide additional cleaning action in removing stubborn debris, after said cleaning solvent has been forced out of the canister in a stream a further cleaning action can then be performed by forcing pressurized air through the canister and into the transmission cooler, the pressurized air that is passed through the canister mixes with a residue of the cleaning solvent remaining in the canister thereby providing an atomized cleaning action in addition to flushing the transmission cooler with the hydraulic stream of the cleaning solvent.

18. The system of claim 17 wherein said angular high pressure air passageway has an air pressure relief valve attached thereto thereby regulating that amount of air pressure that passes through the angular high pressure air passageway into the canister.

19. The system of claim 17 wherein said air inlet of the handle has an air pressure gauge and an air pressure regulator attached thereto thereby allowing the user to monitor and adjust the air pressure entering the hand held portable transmission cooler flushing apparatus.

20. The system of claim 9 wherein said cleaning solvent is a fluid selected from the group consisting of automatic transmission fluid and mineral spirits.

* * * * *